Nov. 17, 1964   R. J. BERNOTAS   3,157,239
FOUR WHEEL DRIVE, TWO-ENGINE, ARTICULATED FRAME TRACTOR
Filed Sept. 7, 1961   4 Sheets-Sheet 1

INVENTOR.
Ralph J. Bernotas
BY
ATTORNEY

Nov. 17, 1964 R. J. BERNOTAS 3,157,239
FOUR WHEEL DRIVE, TWO-ENGINE, ARTICULATED FRAME TRACTOR
Filed Sept. 7, 1961 4 Sheets-Sheet 3

INVENTOR.
Ralph J. Bernotas
BY
ATTORNEY

United States Patent Office 3,157,239
Patented Nov. 17, 1964

3,157,239
FOUR WHEEL DRIVE, TWO-ENGINE,
ARTICULATED FRAME TRACTOR
Ralph Joseph Bernotas, South Euclid, Ohio, assignor to
General Motors Corporation, Detroit, Mich., a corporation of Delaware
Filed Sept. 7, 1961, Ser. No. 148,302
14 Claims. (Cl. 180—51)

This invention pertains to tractors or prime movers of the type used in the earth-moving industry and, more particularly, to a rubber-tired tractor vehicle comprising two frame sections having their adjacent ends interconnected for relative steering articulation about a substantially vertical axis and relative oscillation about a substantially horizontal axis, each frame section including a pair of power plants respectively drivingly connected to wheel means located on each side of each frame section to provide independent four wheel drive for the vehicle.

Tractors or prime movers of the type to which the present invention pertains typically comprise front and rear frame sections each of which is equipped with non-dirigibly mounted ground-engaging wheel means, and means for interconnecting adjacent ends of the frame sections to suspend them from each other and also to permit relative frame oscillation and relative steering articulation of the frames under the influence of suitable power devices such as hydraulic jacks extending between and operatively connected to the two frame sections. Furthermore, in vehicles of the type aforementioned, a single power plant has been mounted on one of the frame sections and has been connected through a suitable split power train to the wheel means located on both frame sections so as to provide four wheel drive in the case of a four wheel vehicle.

In vehicles of this type, the means connecting or suspending adjacent ends of the two frame sections has some adverse effect upon operation of the vehicle. For example, as the two frame sections oscillate relative to each other, an implement such as a dozer blade mounted on one of the frame sections also rocks with the frame section about a horizontal longitudinal axis. Thus, one or the other of the lower corners of the blade dips thereby disrupting the depth or type of cut intended to be made. Furthermore, in oscillating and steering suspension connections of this type, some inadvertent steering action often occurs when not desired by reason of the oscillation of the frame sections. In other words, the mechanical connection between the frame sections is such that rocking of one frame section relative to the other about the aforementioned horizontal axis results in the steering portion of the suspension connection to tend to pull one frame section to the left or to the right even though a turn in this direction is not desired. Finally, vehicles of this type having only one power plant to drive all wheels have been found to be under-powered in certain applications, such as use as a prime mover for extremely large earth-moving scraper bowls. Furthermore, for various reasons, it is not always satisfactory to avoid this difficulty merely by installing a larger power plant. For example, as larger and larger power plants are required and installed on one of the two frame sections, it will be readily apparent that service problems of weight distribution and lack of space are encountered.

It is, therefore, a principal object and feature of this invention to provide an improved articulated vehicle of this type characterized by a novel means interconnecting and suspending adjacent ends of two frame sections of the vehicle which tends to stabilize relative frame oscillation and consequently the attitude of a material handling implement, such as a dozer blade, mounted on one of the oscillating frame sections.

It is yet another object and feature of this invention to provide a suspension connection between the adjacent ends of two frame sections of the vehicle which will minimize the tendency of the frame sections to be steered inadvertently relative to each other in response to relative frame oscillation.

It is yet another object and feature of this invention to provide a vehicle comprising two pivotally interconnected frame sections each of which comprises a pair of ground-engaging wheel means adapted to be driven respectively by an individual power plant and drive train, two power plants being provided on each frame section to drive the two wheels mounted thereon, respectively.

These and other objects of the invention and the manner in which they are attained will become more apparent hereinafter as the description of the invention proceeds, and in which reference is made to the drawings in which.

Figure 1:
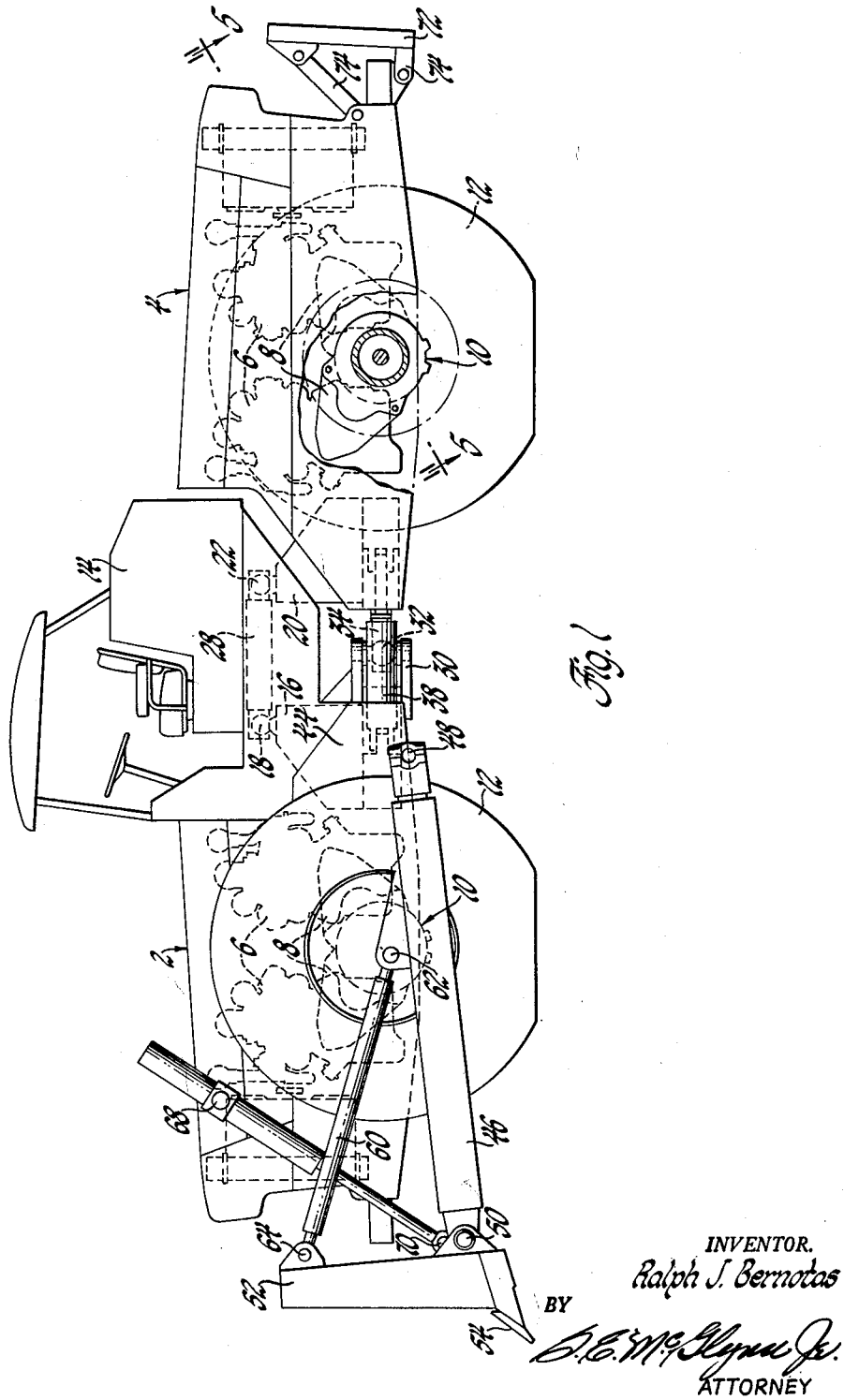
FIGURE 1 is a side elevation of a vehicle equipped with a preferred embodiment of the invention.
Figure 2:
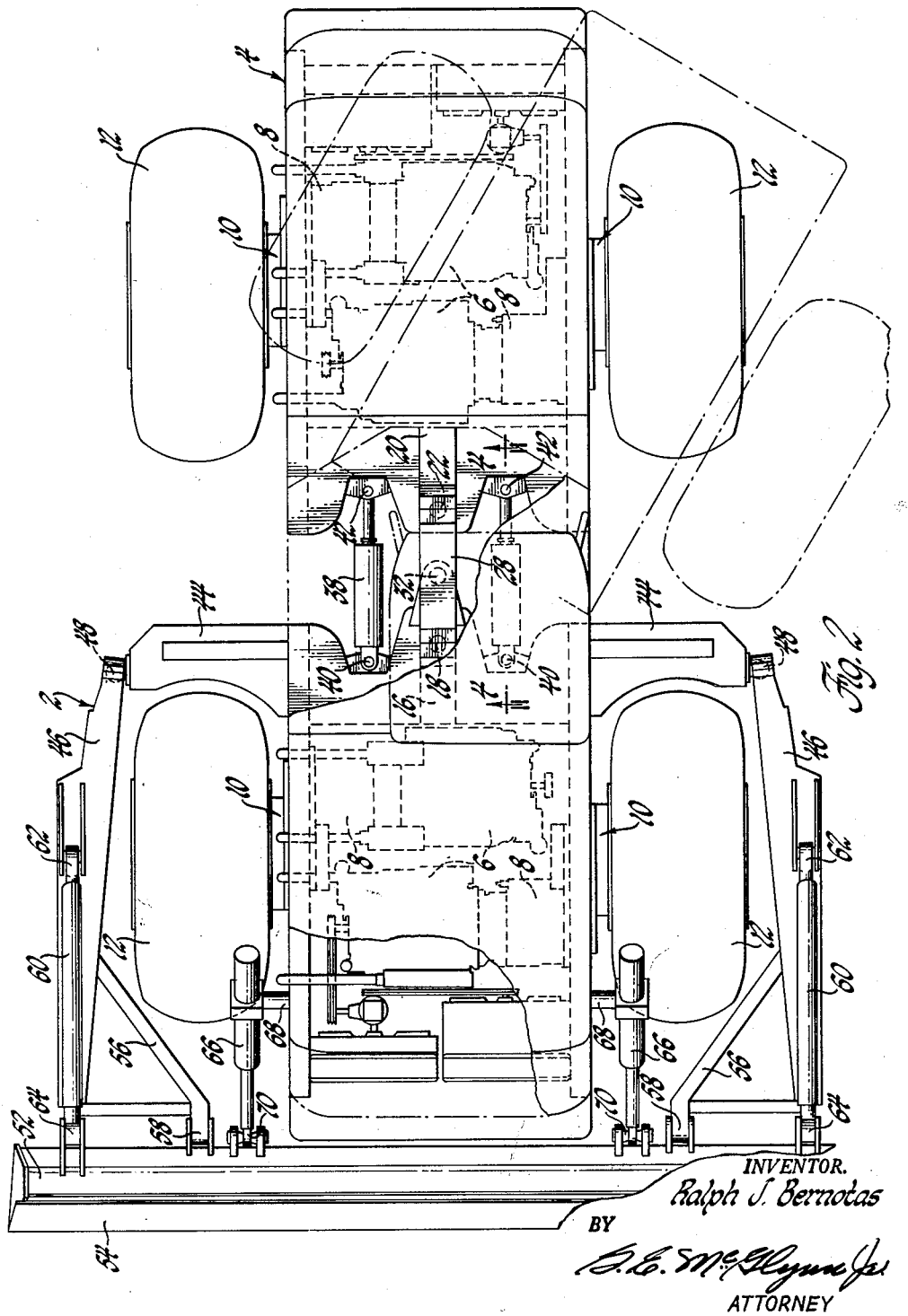
FIGURE 2 is a top plan view of the vehicle of FIGURE 1, partly broken away to illustrate certain details.

Referring now to the drawings, the tractor vehicle shown particularly in FIGURES 1 and 2 comprises a first and in this instance, front frame section 2 and a second or rear frame section 4. A pair of power plants 6 are mounted on and transversely of each frame section in parallel relationship. Opposite ends of the respective power plants are each connected through suitable drive transmitting mechanism 8 to a final drive assembly 10 for each of the rubber tired wheels 12 located on opposite sides of each frame section. As will appear more fully hereinafter, the drive axles of each final drive assembly 10 associated with each frame section are aligned for rotation about a common axis extending transversely of the vehicle, and which axis is substantially equidistantly or symmetrically spaced relative to the longitudinal axis of each power plant 6 on that frame section. Thus, the power plants 6 on a given frame section straddle the drive axles of that frame section for optimum weight distribution thereon. As will be clear from FIGURES 1 and 2, each of the frame sections 2 and 4 is substantially symmetrical except that the first or front frame section 2 is equipped with an operator's compartment 14 generally overhanging the connecting and suspension means between the frame sections as will now be described.

A post 16 is rigidly connected to the rear portion of the front frame 2, and upstands therefrom to mount upstanding ball member 18. The second frame member 4 is similarly provided with such a post 20 and ball member 22. These ball members lie in a common horizontal plane so as to be received by sockets 24 and 26 formed in opposite ends of a horizontally extending suspension member or compression link 28. A bifurcated bracket or tongue 30 is rigidly secured to and extends rearwardly from the first frame 2 beneath the suspension member 28, and mounts between its legs a ball member 32. In similar fashion a rigid tongue or bracket 34 projects forwardly from the adjacent end of the second frame 4, and is provided with an open-ended socket 36 embracing the ball member 32. As will be appreciated, the suspension member or compression link 28 actually suspends the adjacent ends of each frame section from each other; that is, acting in compression, it prevents the adjacent ends of the frame sections from collapsing downwardly about a horizontal transverse axis through the center of the ball joint formed by ball member 32 and socket 36.

Figure 3:
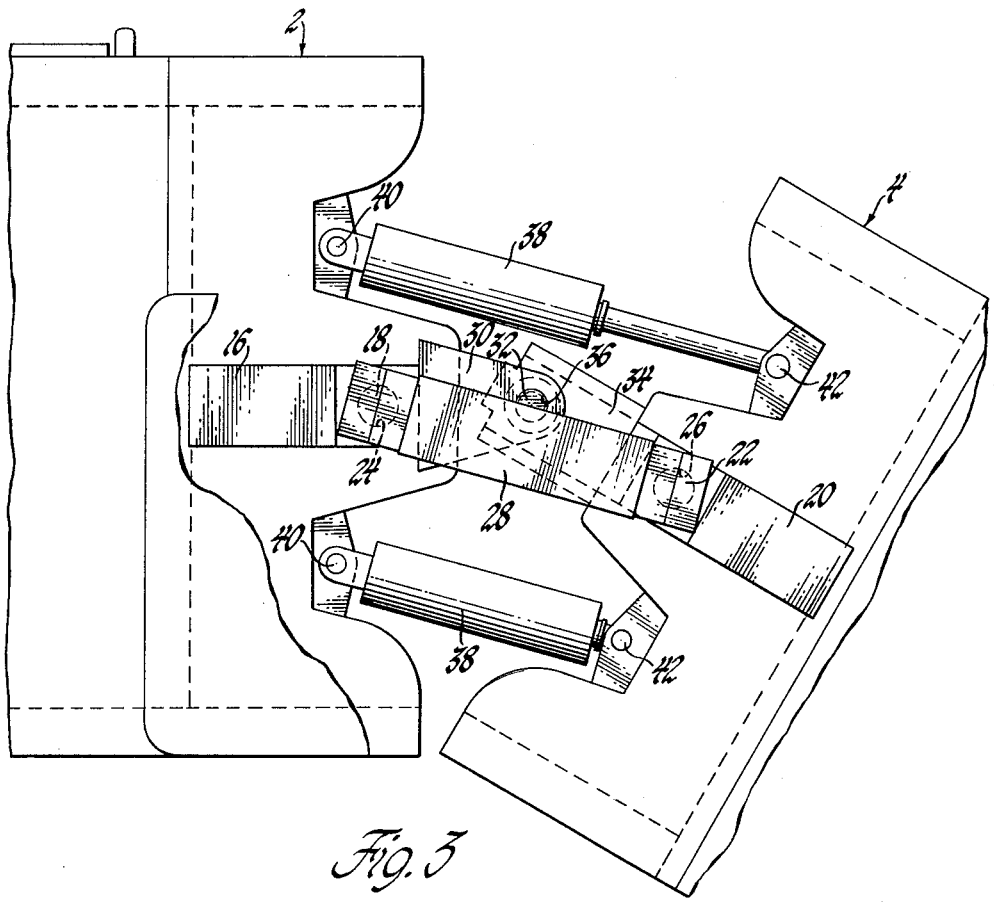
FIGURE 3 is a fragmentary enlarged view of a portion of FIGURE 2 illustrating steering articulation of the vehicle frame sections.
Figure 4:
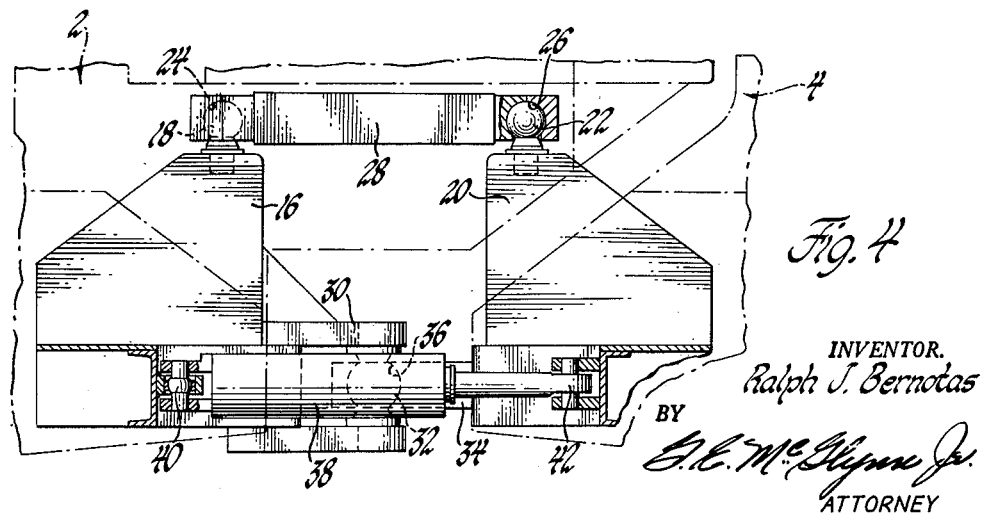
FIGURE 4 is an enlarged view taken on line 4—4 of FIGURE 2.

It will be noted that in the straight-ahead steering position of the frame sections as shown in full lines in FIG. 2, the centers of the three ball and socket joint connections aforedescribed are substantially in a vertical longitudinal plane containing the center line of the tractor vehicle. Furthermore, to maintain the wheels 12 of both frame sections in tractive engagement with the ground while traversing rough and irregular terrain, the frame sections 2 and 4 are free to oscillate relative to each other about a substantially horizontal longitudinally extending axis through the center of ball member 32, which axis is contained in the aforementioned plane with the vehicle steered in the straight-ahead direction and is oblique thereto upon steering the vehicle as illustrated in FIG. 3. Also, the frames may be articulated horizontally relative to each other about a vertical steering axis passing through the center of ball member 32 and, as will be noted, bisecting the suspension member 28 with the vehicle steered straight-ahead as shown in FIGS. 2 and 4. Two laterally spaced fluid operated preferably double-acting steering jacks 38 comprising pistons reciprocably disposed in cylinders each have one end suitably universally connected at 40 in a conventional manner to the rearward end of front frame 2 and the other end pivotally connected at 42 to the forward end of rear frame 4, and are symmetrically disposed on opposite sides of the aforementioned vertical plane containing the ball joints.

While the prime mover vehicle disclosed may be used for several purposes such as drawing a scraper bowl behind it or carrying various earth working implements such as a front end loader linkage and various types of dozer blades, the latter type of implement is illustrated in the drawings as being connected on the front frame section 2. A pair of laterally projecting mounting brackets 44 are rigidly secured to a rearward portion of the front frame and extend beyond and behind the front frame section wheels 12 just outboard of the latter. A pair of push beams 46 each has one end suitably universally connected at 48 to a mounting bracket, and extend forwardly therefrom toward the front end of the frame section 2. The forward end of each push beam is pivotally connected at 50 on a common transverse axis to the lower edge of a dozer blade mold board 52 having a transversely extending cutting edge 54 thereon. Each push beam is further provided with a reinforcing strut 56 pivotally connected at 58 to the mold board on the aforementioned common axis. Further struts 60 extend between and are operatively pivotally connected at 62 and 64 to each push beam and an upper corner of the mold board. These struts may be manually adjustable or adjustable under power to control the forward and rearward pitch of the mold board about the pivotal connection of the latter to the push beam construction. A pair of fluid pressure operated jacks 66 have their cylinder elements pivotally mounted by means of trunnions 68 to the front frame and the piston elements thereof pivotally connected at 70 to the mold board on a common transverse axis to control vertical positioning of the latter. If desired, the rear frame section may be provided with a transversely extending push plate 72 suitably connected by bracket means 74 to the rear end of the rear frame section so as to be adapted to engage the rear "stinger" or push bumper of a scraper for the purpose of push-loading the latter.

Referring now to the operation of the vehicle with particular reference to the ball joint connecting means between the frame sections, it may be assumed by way of example that the vehicle is being steered straight ahead and is disposed as shown in full lines in FIG. 2 of the drawings. As the vehicle traverses irregular terrain and assuming, for example, that the right front wheel drops into a depression relative to the other wheels, the front frame section 2 will oscillate relative to the rear frame section about a horizontal longitudinally extending axis through the center of the ball joint 32, 36. As the front wheel drops in this manner and the front frame section 2 oscillates, it will be appreciated that the ball joint connection 18, 24 moves in an arcuate path because ball member 18 moves with frame section 2. However, extreme oscillation is prevented because of the fixed length of the suspension member 28 between the ball joints 18, 24 and 22, 26. In other words, as the ball joint 18, 24 oscillates in an arcuate path with frame 2, the distance between this joint and joint 22, 26 tends to increase beyond the length of suspension member 28. Since member 28 is of a fixed length, it resists this increase in distance and tends to hold up the right front wheel of the vehicle. Thus, during relative frame oscillation, the member 28 tends to stabilize such oscillation and the position of any implement mounted thereon such as the dozer blade 54. Again referring to the example aforementioned, as the right front wheel 12 drops and the front frame section oscillates, this action would cause the right lower corner of the blade to dip into the ground, thus disrupting the selected depth of cut. However, due to the stabilizing action aforementioned, the member 28 tends to retain the blade at its selected depth of cut although, of course, there will be some variation.

Such oscillating action also causes some forced steering in the vehicle. Again referring to the example, the aforementioned arcuate path of ball joint 18, 24 of suspension member 28 has a rearward component due again to the fixed length of member 28. Thus, depending upon the extent of oscillation, the rearward pull of member 28 may be large enough to overcome the pressure of the fluid within the right hand steering jack 38 to cause some degree of forced steering to the right about the aforementioned vertical steering axis through joint 32, 36. However, since this vertical axis bisects the member 28, this forced steering action is halved thereby reducing the effect of such forced steering. Such action is to be compared with that which would result if the vertical steering axis were to be aligned with one or the other of the ball joints of member 28 in which such forced steering would be twice as great.

Figure 5:
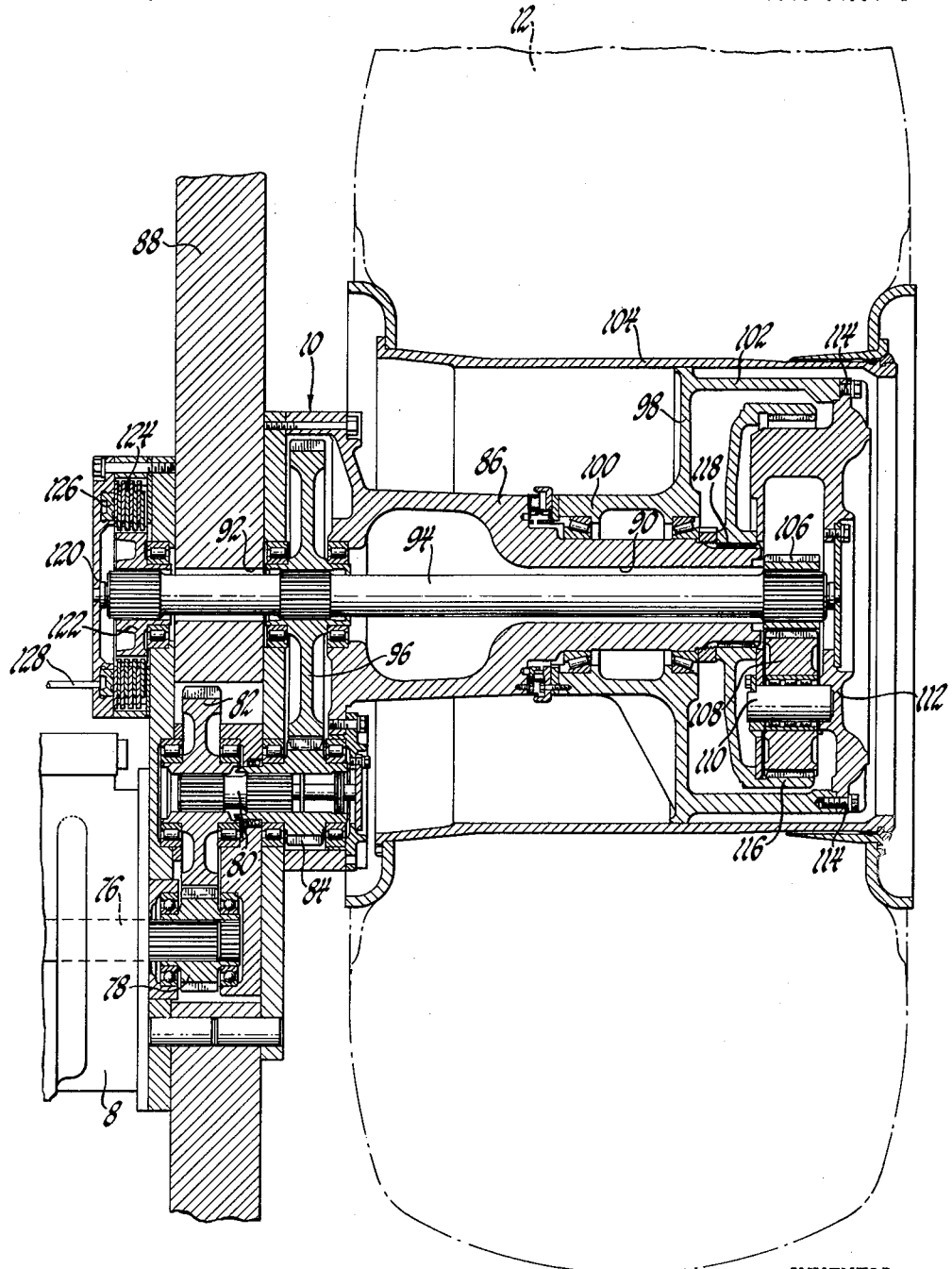
FIGURE 5 is an enlarged view taken on line 5—5 of FIGURE 1.

As previously mentioned, each power plant 6 is connected through a suitable power train 8 to the final drive assembly 10 of each wheel illustrated in FIG. 1 to provide four-wheel drive. Since each power train may be identical to the others, further description will be made with reference particularly to FIG. 5 showing one such power train. Drive is transmitted from each power plant through a drive transmitting mechanism 8 having an output shaft 76 to which a gear 78 is secured. A suitably rotatably mounted shaft 80 carries a gear 82 meshing with the gear 78, and a second gear 84 for transmitting drive at a suitable ratio to the final drive assembly 12, a description of which now follows:

Each final drive assembly comprises an axle housing 86 having one end thereof rigidly secured to a longitudinally extending rail member 88 of each vehicle frame section 2 and 4, and projects laterally outwardly therefrom. A bore 90 extends through this housing in alignment with an opening 92 in the frame rail 88. As will be obvious, the final drive housings on each frame section are aligned with each other. A final drive axle shaft 94 is suitably rotatably mounted in the housing 86, and carries a gear 96 meshing with gear 84 to rotatably drive the axle shaft. A wheel rim support 98 includes a hollow cylindrical hub 100 suitably rotatably mounted about the axle housing 86, and a hollow cylindrical axially outwardly opening drum 102 enclosing a suitable reduction gearing to be described. An axially elongate wheel rim 104, of conventional construction, extends around axle housing 86 and is suitably rigidly secured as by welding to the rim support 98 and removably mounts a ground-engaging tire 12.

Drive may be conducted from the axle shaft 94 to the wheel rim 104 by any suitable reduction gearing. However, according to the preferred embodiment illustrated, planetary reduction gearing of a suitably selected ratio is utilized and is contained substantially within the drum 102 at the axially outer end housing 86. This planetary reduction gearing comprises a sun gear 106 mounted on the outer end of the axle shaft and meshing with a suitable number of planet pinions 108 rotatably mounted as by pins 110 on the planets carrier 112 having its periphery suitably rigidly secured as by fasteners 114 to the drum 102 and hence the wheel rim. A reaction gear in the form of an internal ring gear 116 meshes with the planet pinions, and is non-rotatably mounted on the housing 86 as by the splined connection 118.

As will be apparent, a power plant 6 rotatably drives an axle shaft 94 through gears 78, 82, 84 and 96 at a suitably selected ratio. Rotation of axle shaft 94 causes the sun gear 106 to rotate the planet pinions 108 which, due to their reaction against the fixed ring gear 116, rotatably drives carrier 112 and wheel rim 104 to drive the vehicle.

The inner end of the axle shaft 94 extends through the frame rail opening 92 into a brake housing 120 secured to the inboard side of the rail, and a disc carrier 122 is secured to this end of the axle shaft. A conventional disc brake pack indicated at 124 includes the usual interleaved annular disc elements respectively splined to the carrier 122 and a portion of the fixed housing 120 so that axial pressure applied at one end of the pack causes the respective elements thereof to frictionally engage each other to brake the axle shaft. The brake pack 124 is applied and released by an annular fluid pressure operated piston 126 suitably reciprocably disposed within the housing 120 and controlled through a conduit 128 connected with a conventional fluid pressure operated brake system associated with the vehicle.

Since the brake assembly is located at the inner end of the axle shaft inboard of the frame rail 88, it is much more accessible for maintenance than is the case in brake assemblies acting directly on the wheel rim at the axially outer end of the final drive assembly. In addition, since the brake acts directly upon the axle shaft 94 which is the input member to the final drive reduction gearing, it takes advantage of the reduction between the axle shaft 94 and the wheel rim 104. In other words, and assuming for example that the final drive reduction ratio is 6:1, ten pounds of braking effort applied by the brake pack 124 provides sixty pounds of braking torque at the wheel rim 104. Consequently, by locating the brake assembly at the input of the planetary reduction gearing, that is, on the axle shaft 94, an advantage is gained from this reduction gearing in permitting the use of a much smaller brake package than is required in conventional final drives which act on the wheel rim or output of the assembly and must provide the sixty pounds of braking torque aforementioned.

From the foregoing description, it will now be seen that the tractor of this invention comprises two frame sections each of which is provided with tractor wheels driven through their own individual power trains including individual power plants. A pair of such power plants are so located on each frame section as to distribute weight on each frame section of the vehicle in an optimum manner. Furthermore, the ball joint connecting means which suspends the frame sections from each other and permits relative frame oscillation and relative steering action, results in stabilization of the frame sections during relative frame oscillation and minimizes the forced steering effect during such oscillation.

While but one form of the invention has been shown and described, other forms will now be apparent to those skilled in the art. Therefore, the embodiment shown in the drawings is merely for illustrative purposes and is not intended to limit the scope of the invention which is defined by the claims which follow.

I claim:

1. A vehicle comprising a first frame, a second frame, ground-engaging means mounted on and supporting each of said frames, a suspension member extending between and having spaced first and second points thereon respectively pivotally connected to said frames, and means pivotally interconnecting said frames at a third point substantially equidistantly spaced from the respective pivotal connections of said member to said frames for relative oscillation of the latter about a horizontal longitudinally extending axis through said third point, said first and second points being located on said frames in positions offset from said horizontal axis so that oscillation of one of said frame sections relative to the other about said horizontal axis causes said member to be placed in tension to stabilize such oscillation.

2. A vehicle comprising a first frame, a second frame, ground-engaging means mounted on and supporting each of said frames, a suspension member extending substantially horizontally between and having spaced first and second points thereon respectively pivotally connected to said frames, and means pivotally interconnecting said frames at a third point substantially equidistantly spaced from the respective pivotal connections of said member to said frames for relative oscillation of the latter about a horizontal longitudinally extending axis through said third point, said first and second points being located on said frames in positions offset from said horizontal axis so that oscillation of one of said frame sections relative to the other about said horizontal axis causes said member to be placed in tension to stabilize such oscillation.

3. A vehicle comprising a first frame, a second frame, ground-engaging means mounted on and supporting each of said frames, a suspension member extending between and having spaced points thereon respectively pivotally connected to said frames, and a universal joint interconnecting said frames at a point vertically spaced from said points and substantially equidistantly spaced from the respective pivotal connections of said member to said frames, said joint including an axis of relative frame oscillation extending parallel to said member and an axis of relative frame articulation bisecting said member.

4. A vehicle comprising a first frame, a second frame, ground-engaging means mounted on and supporting each of said frames, a suspension member extending substantially horizontally between and having spaced points thereon respectively pivotally connected to said frames, and a universal joint interconnecting said frames at a point vertically spaced from said points and substantially equidistantly spaced from the respective pivotal connections of said member to said frames, said joint including an axis of relative frame oscillation extending parallel to said member and a substantially vertical axis of relative frame articulation bisecting said member.

5. A vehicle comprising a first frame, a second frame, ground-engaging means mounted on and supporting each of said frames, a suspension member extending substantially horizontally between said frames, first and second universal joints pivotally connecting spaced points on said member respectively to said frames, and a third universal joint interconnecting said frames, said third joint including a socket carried by one of said frames receiving a ball carried by the other of said frames, said ball being so positioned that a vertical axis passing therethrough is located midway between the respective pivotal connections of said member to said frames, said frames being oscillatable relative to each other about an axis through the center of said ball parallel to said member and articulatable relative to each other about a said vertical axis.

6. A vehicle comprising a first frame, a second frame, ground-engaging means mounted on and supporting each of said frames, means suspending adjacent ends of said frames from each other and including a rigid suspension member extending between the ends of said frames, first and second universal joints respectively connecting said suspension member to the respective ends of said frames, and a third universal vertically and substantially equidistantly spaced from said first and second joints and connecting the ends of said frames, said frames being oscillatable relative to each other about an axis through said third joint parallel to said suspension member, and being articulatable relative to each other about an axis through said third joint bisecting said suspension member between said first and second joints.

7. A vehicle comprising a first frame, a second frame, ground-engaging means mounted on and supporting each of said frames, means suspending adjacent ends of said frames from each other and including a rigid suspension member extending substantially horizontally between the ends of said frames, first and second universal joints respectively connecting the ends of said suspension member to the respective ends of said frames, and a third universal joint connecting the ends of said frames and vertically spaced from said suspension member, each of said joints including a ball member universally engaged within a socket member, the center of said ball member of said third joint being substantially equidistantly spaced from the centers of said ball members of said first and second joints, said frames being oscillatable relative to each other about a horizontal axis through the center of said ball member of said third joint parallel to said suspension member, and being articulatable relative to each other about a substantially vertical axis through the center of said ball member of said third joint bisecting said suspension member between said first and second joints.

8. The invention as defined in claim 3 which further includes means operable to articulate said frames relative to each other about said last-named axis.

9. The invention as defined in claim 5 which further includes means operable to articulate said frames relative to each other about said vertical axis.

10. The invention as defined in claim 7 which further includes means operable between said frames to articulate the latter relative to each other about said vertical axis.

11. The vehicle as defined in claim 1 in which said ground-engaging means consists of wheels mounted on each side of each of said frames for rotation about a common axis extending transversely of said respective frame, a pair of power plants mounted parallel to each other and transversely of each frame substantially equidistantly from the axis of rotation of the wheel means thereon, and a power train drivingly connecting each of said power plants on each of said frames to a respective one of said wheel means thereon.

12. The vehicle as defined in claim 3 in which said ground-engaging means consists of wheels mounted on each side of each of said frames for rotation about a common axis extending transversely of said respective frame, a pair of power plants mounted parallel to each other and transversely of each frame substantially equidistantly from the axis of rotation of the wheel means thereon, and a power train drivingly connecting each of said power plants on each of said frames to a respective one of said wheel means thereon.

13. The vehicle as defined in claim 5 in which said ground-engaging means consists of wheels mounted on each side of each of said frames for rotation about a common axis extending transversely of said respective frame, a pair of power plants mounted parallel to each other and transversely of each frame substantially equidistantly from the axis of rotation of the wheel means thereon, and a power train drivingly connecting each of said power plants on each of said frames to a respective one of said wheel means thereon.

14. The vehicle as defined in claim 7 in which said ground-engaging means consists of wheels mounted on each side of each of said frames for rotation about a common axis extending transversely of said respective frame, a pair of power plants mounted parallel to each other and transversely of each frame substantially equidistantly from the axis of rotation of the wheel means thereon, and a power train drivingly connecting each of said power plants on each of said frames to a respective one of said wheel means thereon.

References Cited in the file of this patent

UNITED STATES PATENTS

| | | |
|---|---|---|
| 2,406,797 | Buckendale | Sept. 3, 1946 |
| 2,516,816 | Wagner et al. | July 25, 1950 |
| 2,594,695 | Storey | Apr. 29, 1952 |
| 2,941,612 | Bernotas | June 21, 1960 |